(12) United States Patent
Chen et al.

(10) Patent No.: US 11,831,735 B2
(45) Date of Patent: Nov. 28, 2023

(54) METHOD AND DEVICE FOR PROCESSING MINI PROGRAM DATA

(71) Applicant: BAIDU ONLINE NETWORK TECHNOLOGY (BEIJING) CO., LTD., Beijing (CN)

(72) Inventors: Du Chen, Beijing (CN); Yuzhen Chen, Beijing (CN); Jiaxing Fu, Beijing (CN); Rensong Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 166 days.

(21) Appl. No.: 17/203,580

(22) Filed: Mar. 16, 2021

(65) Prior Publication Data

US 2021/0218824 A1    Jul. 15, 2021

(51) Int. Cl.
*H04L 67/5651*    (2022.01)
*H04L 41/0681*    (2022.01)
(Continued)

(52) U.S. Cl.
CPC ...... *H04L 67/5651* (2022.05); *H04L 41/0681* (2013.01); *H04L 67/1095* (2013.01); *H04L 67/34* (2013.01); *H04L 67/63* (2022.05)

(58) Field of Classification Search
CPC ............. H04L 67/5651; H04L 41/0681; H04L 67/1095; H04L 67/34; H04L 67/63;
(Continued)

(56) References Cited

U.S. PATENT DOCUMENTS 5,951,636 A *   9/1999   Zerber .................... H04L 51/00
                                                               709/202
6,745,229 B1    6/2004   Parmeshwar
(Continued)

FOREIGN PATENT DOCUMENTS

| CN | 102387195 A | 3/2012 |
|----|-------------|--------|
| CN | 102891858 A | 1/2013 |

(Continued)

OTHER PUBLICATIONS

Notice of Reason for Rejection of the parallel JP application 2021-064678.
(Continued)

*Primary Examiner* — Javier O Guzman
(74) *Attorney, Agent, or Firm* — J.C. PATENTS

(57) ABSTRACT

The present application discloses a method and a device for processing mini program data, which relates to the technical field of data processing and cloud computing. The method for processing mini program data is applied to a proxy server, and the specific implementation scheme is: obtaining a user data request of a developer server of a mini program, where the user data request is generated by the developer server according to a user request of a user terminal of the mini program; determining returned data according to the user data request, where the returned data of the proxy server is obtained through data synchronization between the proxy server and the developer server; and sending the returned data to the user terminal. In addition, the present application also discloses a proxy server and a developer server.

12 Claims, 5 Drawing Sheets

(51) Int. Cl.
*H04L 67/1095* (2022.01)
*H04L 67/00* (2022.01)
*H04L 67/63* (2022.01)

(58) Field of Classification Search
CPC ....... H04L 67/02; H04L 67/53; H04L 67/289; H04L 67/568; H04L 67/10; H04L 67/562; G06F 9/5083
See application file for complete search history.

(56) References Cited

U.S. PATENT DOCUMENTS

| | | | | |
|---|---|---|---|---|
| 6,748,367 | B1 * | 6/2004 | Lee | G06Q 20/382 705/64 |
| 6,976,059 | B1 * | 12/2005 | Rogalski | H04L 67/02 717/148 |
| 7,210,101 | B2 * | 4/2007 | Terashima | G06F 16/9577 707/E17.121 |
| 10,482,069 | B1 * | 11/2019 | Barnes | G06F 11/2046 |
| 11,121,863 | B1 * | 9/2021 | O'Neill | H04L 9/3213 |
| 2001/0016880 | A1 * | 8/2001 | Cai | H04L 67/04 719/321 |
| 2001/0034771 | A1 * | 10/2001 | Hutsch | H04L 61/35 709/217 |
| 2002/0047859 | A1 * | 4/2002 | Szlam | G06F 16/957 715/705 |
| 2008/0140772 | A1 * | 6/2008 | Balassanian | H04L 63/123 709/203 |
| 2011/0093925 | A1 * | 4/2011 | Krishnamoorthy | G06F 21/31 711/E12.001 |
| 2012/0149302 | A1 * | 6/2012 | Sekiya | H04L 63/0492 455/41.1 |
| 2013/0173694 | A1 * | 7/2013 | Arsenault | H04L 45/22 709/203 |
| 2015/0264049 | A1 * | 9/2015 | Achilles | H04L 67/306 726/7 |
| 2015/0350173 | A1 * | 12/2015 | Tanase | H04L 63/08 726/7 |
| 2015/0373139 | A1 | 12/2015 | Kisel | |
| 2021/0141853 | A1 * | 5/2021 | Whitney | G06F 21/6218 |
| 2021/0336937 | A1 * | 10/2021 | Gao | H04L 67/02 |

FOREIGN PATENT DOCUMENTS

| | | |
|---|---|---|
| CN | 103647811 A | 3/2014 |
| CN | 106911735 A | 6/2017 |
| CN | 107979630 A | 5/2018 |
| CN | 109814942 A | 5/2019 |
| CN | 110302533 A | 10/2019 |
| CN | 110389936 A | 10/2019 |
| CN | 110908738 A | 3/2020 |
| CN | 110955438 A | 4/2020 |
| CN | 111026462 A | 4/2020 |
| CN | 111046062 A | 4/2020 |
| EP | 3522042 A1 | 8/2019 |
| JP | H09251414 A | 9/1997 |
| JP | 2004118866 A | 4/2004 |
| JP | 2005327121 A | 11/2005 |
| JP | 2008198158 A | 8/2008 |
| JP | 2009237918 A | 10/2009 |
| JP | 2016504678 A | 2/2016 |
| WO | WG2017063533 A1 | 4/2017 |

OTHER PUBLICATIONS

The EESR of EP application No. 21163976.0.
Notice of Rejection of the parallel JP application 2021-064678.
First Office Action of the priority application CN202010598298.6.
"Deploy small program server from scratch (Tencent Cloud)", https://www.jianshu.com/p/b9f6c8801594, May 25, 2017.
"Replacement Policies for a Proxy Cache", IEEE/ACM Transactions on Networking, vol. 8, No. 2, Apr. 2000, pp. 158-170.
"Research of On-line Monitoring Device Based on WeChat Mini Program Cloud Service and Raspberry PI", 电子质量 (Electron Mass), vol. 11, Dec. 26, 2019, pp. 45-49.

* cited by examiner

METHOD AND DEVICE FOR PROCESSING MINI PROGRAM DATA

CROSS-REFERENCE TO RELATED APPLICATION

This application claims priority to Chinese Patent Application No. 202010598298.6, filed on Jun. 28, 2020, which is hereby incorporated by reference in its entirety.

TECHNICAL FIELD

The embodiments of the present application relate to the field of data processing technologies in the field of computer technologies, and in particular, to a method and a device for processing mini program data.

BACKGROUND

With the continuous development of computer technologies, various applications emerge in endlessly. As an application that can be used without being downloaded and installed, a mini program is favored by users.

For a traditional mini program, data services are provided to users by using a developer server. Mini programs have low barriers to development, and thus, for some individuals or small business developers, due to their own limitations, mini program servers have poor stability and cannot meet user's needs when the data services of mini programs are independently provided by the developer servers.

SUMMARY

The present application provides a method and a device for processing mini program data, where a proxy server is added and the transmission of mini program data is performed by the proxy server, thereby improving the stability and speed of the transmission of mini program data.

According to an aspect of the present application, a method for processing mini program data is provided, and the method is applied to a proxy server and includes:

obtaining a user data request of a developer server of a mini program, where the user data request is generated by the developer server according to a user request of a user terminal of the mini program;

determining returned data according to the user data request, where the returned data of the proxy server is obtained through data synchronization between the proxy server and the developer server; and sending the returned data to the user terminal.

Optionally, the proxy server is one or more servers in a proxy server cluster, and the determining returned data according to the user data request includes:

determining a proxy server of the user terminal from the proxy server cluster according to the user data request; and determining the returned data via the proxy server according to the user data request.

Optionally, the method further includes:

requesting synchronization data from the developer server at a set data request interval; and evaluating stability of the developer server according to returned information of the synchronization data.

Correspondingly, the obtaining a user data request of a developer server of an mini program includes:

obtaining the user data request of the developer server of the mini program when the stability of the developer server meets a preset stability condition.

Optionally, after the determining returned data according to the user data request, the method further includes:

judging whether the returned data is valid data;

correspondingly, the sending the returned data to the user terminal includes:

sending the returned data to the user terminal when the returned data is valid data.

Optionally, the method further includes:

sending a data update request to the developer server when the user data is invalid data, to update the returned data according to the data update request;

correspondingly, the sending the returned data to the user terminal includes:

sending the updated returned data to the user terminal.

According to another aspect of the present application, a method for processing mini program data is provided, the method is applied to a developer server and includes:

obtaining a user request of a user terminal of a mini program, generating a user data request of the mini program according to the user request; and sending the user data request to a proxy server, so that the proxy server determines returned data according to the user data request and sends the returned data to the user terminal, where the returned data of the proxy server is obtained through data synchronization between the proxy server and the developer server.

Optionally, the user data request includes a returned data request and a proxy server startup request, and the sending the user data request to a proxy server, so that the proxy server determines returned data according to the user data request and sends the returned data to the user terminal, includes:

sending the returned data request to the proxy server when the proxy server startup request is to start the proxy server, so that the proxy server determines the returned data according to the returned data request and sends the returned data to the user terminal.

Optionally, the method further includes:

when the proxy server startup request is not to start the proxy server, determining the returned data via the developer server according to the returned data request, and sending the returned data via the developer server to the user terminal.

Optionally, the method further includes:

obtaining a data update request of the proxy server;

updating the returned data according to the data update request, and sending the updated returned data to the proxy server, to send the updated returned data to the user terminal via the proxy server.

Optionally, the method further includes:

obtaining a stability evaluation result of the developer server from the proxy server, where the stability evaluation result is determined by the proxy server according to returned information of synchronization data, and the synchronization data is obtained by a proxy server cluster through initiating a data synchronization request to the developer server at a set data request interval; and performing a stability warning of the developer server according to the stability evaluation result.

According to another aspect of the present application, a device for processing mini program data is provided, and the device includes:

a user data request obtaining module, configured to obtain a user data request of a developer server of a mini program, where the user data request is generated by the developer server according to a user request of a user terminal of the mini program; and a returned data determining module, configured to determine returned data via a proxy server according to the user data request, where the returned data of the proxy server is obtained through data synchronization between the proxy server and the developer server; and a data sending module, configured to send the returned data to the user terminal.

Optionally, the proxy server is one or more servers in a proxy server cluster, and the returned data determining module includes:

a proxy server determining unit, configured to determine a proxy server of the user terminal from the proxy server cluster according to the user data request; and a returned data determining unit, configured to determine the returned data via the proxy server according to the user data request.

Optionally, the device further includes:

a data synchronization module, configured to request synchronization data from the developer server via the proxy server cluster at a set data request interval, and evaluate stability of the developer server according to returned information of the synchronization data.

Optionally, the device further includes:

a data validity judging module, configured to judge, via the proxy server, whether the returned data is valid data, after the returned data is determined via the proxy server according to the user data request;

correspondingly, the returned data determining module is specifically configured to:

send the returned data to the user terminal when the returned data is valid data.

Optionally, the device further includes:

a data update request module, configured to send a data update request to the developer server via the proxy server when the user data is invalid data, to update the returned data according to the data update request;

correspondingly, the returned data determining module is specifically configured to:

send the updated returned data to the user terminal.

According to another aspect of the present application, a device for processing mini program data is provided, and the device includes:

a user request obtaining module, configured to obtain a user request of a user terminal of a mini program;

a user data request generating module, configured to generate a user data request of the mini program according to the user request;

a data request sending module, configured to send the user data request to a proxy server, so that the proxy server determines returned data according to the user data request and sends the returned data to the user terminal, where the returned data of the proxy server is obtained through data synchronization between the proxy server and the developer server.

Optionally, the user data request includes a returned data request and a proxy server startup request, and the data request sending module is specifically configured to:

send the returned data request to the proxy server when the proxy server startup request is to start the proxy server, so that the proxy server determines returned data according to the returned data request and sends the returned data to the user terminal.

Optionally, the device further includes:

a second returned data determining module, configured to, when the proxy server startup request is not to start the proxy server, determine the returned data via the developer server according to the returned data request, and send the returned data via the developer server to the user terminal.

Optionally, the device further includes:

a data update request obtaining module, configured to obtain a data update request of the proxy server; and a returned data updating module, configured to update the returned data according to the data update request, and send the updated returned data to the proxy server, to send the updated returned data to the user terminal via the proxy server.

Optionally, the device further includes:

a stability obtaining module, configured to obtain a stability evaluation result of the developer server from the proxy server, where the stability evaluation result is determined by the proxy server according to returned information of synchronization data, and the synchronization data is obtained by a proxy server cluster through initiating a data synchronization request to the developer server at a set data request interval; and a stability warning module, configured to perform a stability warning of the developer server according to the stability evaluation result.

According to another aspect of the present application, a proxy server is provided, and the proxy server includes:

at least one processor; and a memory, communicatively connected with the at least one processor; where, the memory stores instructions executable by the at least one processor, and the instructions are executed by the at least one processor, so that the at least one processor execute the method for processing mini program data provided by the embodiment corresponding to the first aspect of the present application.

According to another aspect of the present application, a developer server is provided, and the developer server includes:

at least one processor; and a memory, communicatively connected with the at least one processor; where, the memory stores instructions executable by the at least one processor, and the instructions are executed by the at least one processor, so that the at least one processor execute the method for processing mini program data provided by the embodiment corresponding to the second aspect of the present application.

According to another aspect of the present application, a non-transitory computer-readable storage medium is provided which have computer instructions stored thereon, the computer instructions are configured to cause the computer to execute the method for processing mini program data provided by any of the embodiments of the present application.

According to another aspect of the present application, a method for processing mini program data is provided, and the method is applied to a proxy server and includes:

obtaining a user data request of a developer server of a mini program; and performing a processing on the user data request.

According to the technical solution of the present application, the proxy server perform data synchronization with the developer server, the user data request is generated by the developer server according to the user request, and the data required by the user is returned by the proxy server according to the user data request, which realizes data hosting for mini programs, and improves the speed for processing mini program data and the stability of the mini program server, and improves the quality of the mini program and the user experience.

It should be understood that the content described in the present application is not intended to identify the key or important features of the embodiments of the present application, nor is it intended to limit the scope of the present application. Other features of the present application will be easily understood through the following description.

BRIEF DESCRIPTION OF DRAWINGS

The attached drawings are used to better understand the solution of the present application and do not constitute a limitation to the present application. Among them.

DETAILED DESCRIPTION OF EMBODIMENTS

The exemplary embodiments of the present application are described below in conjunction with the accompanying drawings, which include various details of the embodiments of the present application to facilitate understanding, and should be regarded as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

With the continuous development of computer and the Internet technologies, various types of applications are emerging in an endless stream. As a simple and fast application, a mini program has been popular among the majority of users.

The mini program is an application that can be used without being downloaded and installed. It needs to rely on a host application, such as WeChat, QQ and other instant messaging applications or search applications, to perform corresponding mini program operations.

The technical solution of the present application and how the technical solution of the present application solves the above technical problem will be described in detail below with specific embodiments. The following specific embodiments can be combined with each other, and the same or similar concepts or processes may not be repeated in some embodiments. The embodiments of the present application will be described below in conjunction with the drawings.

Figure 1:
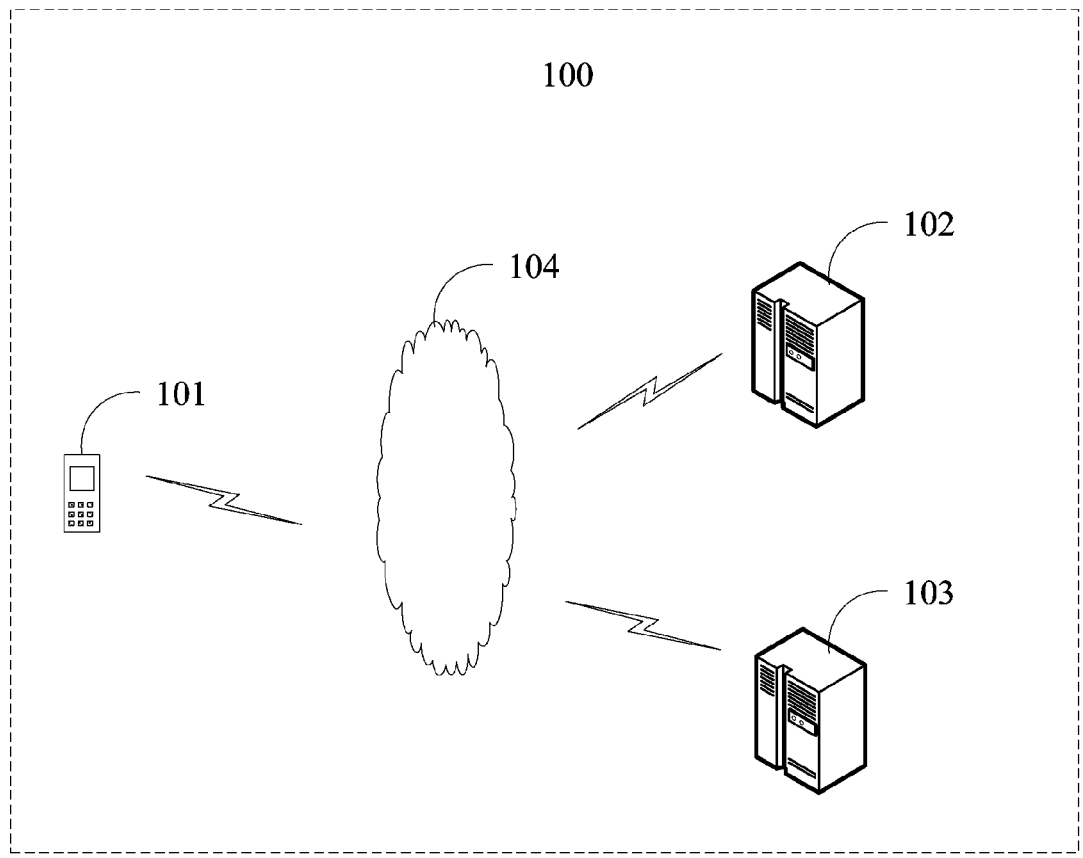
FIG. 1 is a schematic diagram of an application scenario of an embodiment of the present application.

FIG. 1 is a schematic diagram of an application scenario of an embodiment of the present application. As shown in FIG. 1, the technical solution of the present application can be applied to a server. A system architecture 100 of a mini program may include a user terminal 101, a developer server 102, and a host application server 103. The developer server 102 is a server of the mini program, which is configured to provide various kinds of service support for the mini program. The host application server 103 is a server of the host application of the mini program. The user terminal 101 is a client on which the host application is installed. A user may open the mini program based on the host application on the user terminal 101 and perform subsequent operations of the mini program. The user terminal 101 may be various electronic devices, such as a smart phone, a tablet computer, and so on. The user terminal 101, the developer server 102, and the host application server 103 are connected through a network 104. A specific type of the network 104 may be a wired communication connection, a wireless communication connection, or in a fiber optic cable-based mode.

The mini program is only supported by its developer server to provide data support for users of various terminal devices. However, due to the limitations of mini program developers themselves, such as the limitations of funds or the professional level of the development team, the functions and performance of the developer server designed by them are unable to provide users with stable and fast data services.

After creative work, the inventors of the present application obtained the inventive concept of the present application. This application can be applied to the field of data processing technologies in the field of computer technologies. Through the data synchronization between the proxy server and the developer server, the hosting of mini program data is realized, and the stability and speed of the mini program data service are improved.

Figure 2:
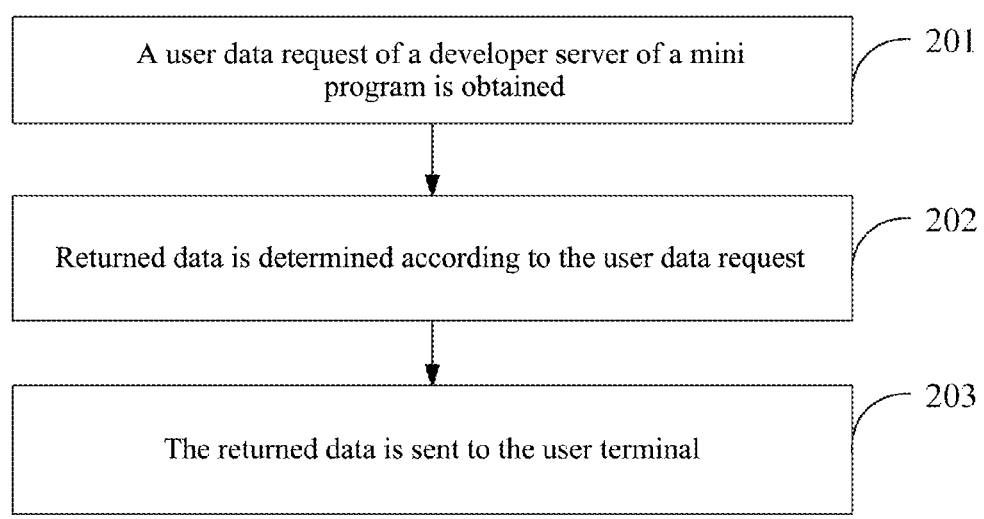
FIG. 2 is a schematic diagram according to a first embodiment of the present application.

FIG. 2 is a schematic diagram according to a first embodiment of the present application. As shown in FIG. 2, the method for processing mini program data provided in the present embodiment is applied to a proxy server, and the method includes:

Step 201, a user data request of a developer server of a mini program is obtained.

The user data request is generated by the developer server according to a user request of a user terminal of the mini program. The developer server is a server designed by a developer of the mini program to provide data support for the mini program. The proxy server is a server designed by a third party to provide data services for the mini program according to an agreement with the developer of the mini program.

Specifically, the user terminal may be a smart phone, a tablet computer, etc. The user request is sent by the user through a host application on the user terminal. The developer server receives the user request, generates a corresponding user data request according to the user request, and sends the user data request to the proxy server.

Illustratively, the user request may be a resource loading request, a user login request, a payment request, etc. The user request may include a user identification and a resource identification of a resource requested by the user, so that the developer server determines the location, link, or acquisition method of the resource requested by the user according to the resource identification of the resource requested by the user, and then combines the user identification to generate a user data request.

Step 202, returned data is obtained according to the user data request.

The returned data of the proxy server is obtained through data synchronization between the proxy server and the developer server.

Specifically, the proxy server and the developer server perform data synchronization according to a preset method, such as performing data synchronization according to a set period, or performing data synchronization at a set time (for example performing data synchronization at a time with low user activity). Of course, other methods may also be used for data synchronization, which is not limited in the present application.

Specifically, the proxy server searches for the returned data corresponding to the user request in the resources stored by the proxy server according to the user data request from the developer server, such as the location, link, or acquisition mode of the resource requested by the user.

Further, the proxy server may actively request data synchronization from the developer server according to a data synchronization request interval sent by the developer server, so as to keep data that is currently cached in the proxy server to be the latest data. Data synchronization may also be requested from the developer server in a regular manner through configuration of the proxy server. When the proxy server stores the synchronization data from the developer server, it may also store information such as a type, a timestamp, and an effective time of the stored synchronization data.

Further, when the returned data cannot be determined based on the user request data, for example, when the returned data corresponding to the user request is not stored in the proxy server, the proxy server may send a returned data request to the developer server, and the developer server sends the returned data to the user terminal, or the developer server sends the returned data to the proxy server according to the returned data request.

Step 203, the returned data is sent to the user terminal.

Specifically, the proxy server may send the returned data to the user terminal of the user according to the user identification in the user data request. The proxy server may send the returned data to the user terminal through a network, and the network may be a wired network, a wireless network, etc.

In the present embodiment, the proxy server perform data synchronization with the developer server, the user data request is generated by the developer server according to the user request, the data required by the user is returned by the proxy server according to the user data request, which realizes the hosting of mini program data, and improves the speed for processing the mini program data and the stability of the mini program server, and improves the quality of the mini program and the user experience.

Figure 3:
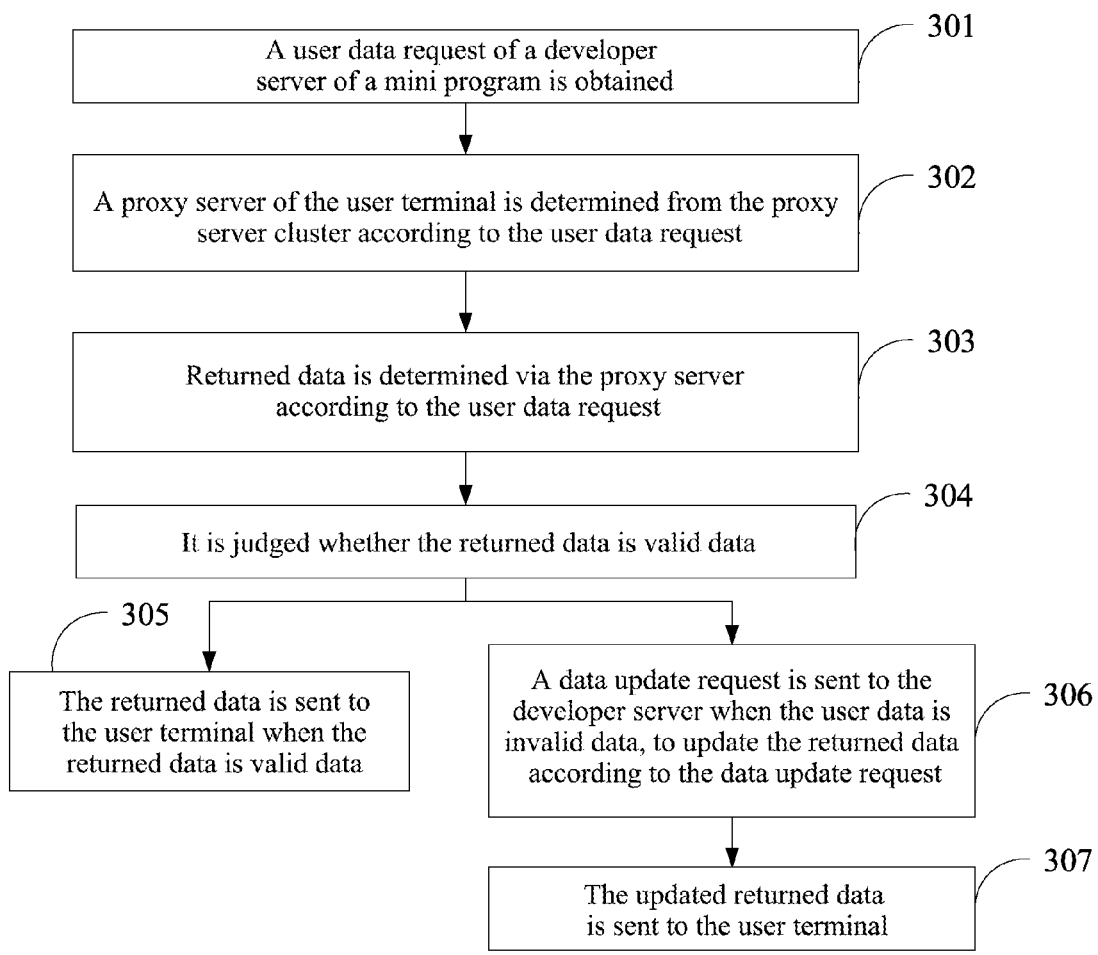
FIG. 3 is a schematic diagram of a second embodiment according to the present application.

FIG. 3 is a schematic diagram of a second embodiment according to the present application. On the basis of the first embodiment, the present embodiment refines Step 202, and adds a step of judging the validity of the returned data after Step 202. As shown in FIG. 3, the method for processing mini program data provided by the present embodiment includes:

Step 301, a user data request of a developer server of a mini program is obtained.

The user data request is generated by the developer server according to a user request of a user terminal of the mini program.

Step 302, a proxy server of the user terminal is determined from the proxy server cluster according to the user data request.

The proxy server cluster may include at least two proxy servers, such as 3, 5, or another number of proxy servers. The proxy server is one or more servers in the proxy server cluster. Respective proxy servers in the proxy server cluster may be distributed in different geographic locations, so that they can better provide excellent data hosting services for developer servers located in various locations, thereby improving the service quality of the mini program.

Specifically, the user data request includes location information of the user terminal of the user, and then, a proxy server whose distance to the user terminal meets a set condition may be determined from the proxy server cluster according to the location information of the user terminal as the proxy server of the user terminal, where the set condition may be that the distance is less than a preset threshold.

Further, a relatively idle proxy server may be selected according to a resource occupancy rate of each proxy server in the proxy server cluster, to perform the data service of the mini program of the user terminal, where the selected proxy server may be specifically a server with a resource occupancy rate less than a preset occupancy rate.

Further, at least one optimal proxy server for the user terminal may be determined from the proxy server cluster according to the resource occupancy rate of each proxy server and the location information of the user terminal.

Step 303, returned data is determined via the proxy server according to the user data request.

By providing a proxy server cluster for developer servers, the proxy server with a low resource occupancy rate and good communication quality with the user terminal is selected from the proxy server cluster for data communication when a data service for a mini program is performed, which further improves the speed and quality of data transmission of the mini program and improves the user experience.

Step 304, it is judged whether the returned data is valid data.

Specifically, it may be judged whether the returned data is valid according to a timestamp or valid time of the returned data.

Further, when a time difference between the timestamp of the returned data and a current time is less than a preset time, it is determined that the returned data is valid data. Or, when the returned data does not exceed its valid time, it is determined that the returned data is valid data.

Illustratively, assuming that the valid time of the returned data D1 is: May 20, 2020, and the current time is May 23, 2020, then the returned data D1 is invalid data. Assuming that the time corresponding to the timestamp of the returned data D2 is: Mar. 21, 2020, the current time is May 13, 2020, and the preset time is 2 months, then the returned data D2 is valid data.

Step 305, the returned data is sent to the user terminal when the returned data is valid data.

By judging the validity of the returned data, the validity of the returned data is effectively guaranteed, and the quality of the data service of the mini program is improved.

Step 306, a data update request is sent to the developer server when the returned data is invalid data, to update the returned data according to the data update request.

Specifically, when the time difference between the timestamp of the returned data and the current time is greater than the preset time, or when the returned data exceeds its valid time, then it is determined that the returned data is invalid data.

When the returned data is invalid data, the proxy server sends a data update request to the developer server. The data update request may include identification information of the returned data, identification information of the proxy server, and user identification information. The developer server sends the updated returned data to the proxy server according to the data update request of the proxy server, to update the returned data in the proxy server.

Step 307, the updated returned data is sent to the user terminal.

Specifically, the proxy server obtains the updated returned data from the developer server, and sends the updated returned data to the user terminal according to the user identification.

By reacquiring invalid returned data, the problem that data services cannot be provided when the data stored by the proxy server is invalid is solved, and normal and smooth operation of the mini program data service is guaranteed.

In the present embodiment, the proxy server cluster determines one or more optimal proxy servers to provide data services for the mini program according to the user data request, which improves the data transmission speed of the mini program and the response speed of the mini program. The quality of the data obtained by the user is guaranteed by judging the validity of the returned data. At the same time, when the returned data is invalid, the returned data is re-acquired to update the returned data, which ensures the real-time nature of the returned data, thus ensuring the normal and smooth operation of the mini program. By providing a proxy server for the developer server of the mini program for data hosting, the performance of the mini program is improved, and the data transmission rate of the mini program is increased. At the same time, the stability of the back-end server of the mini program is guaranteed and the user experience is improved.

Figure 4:
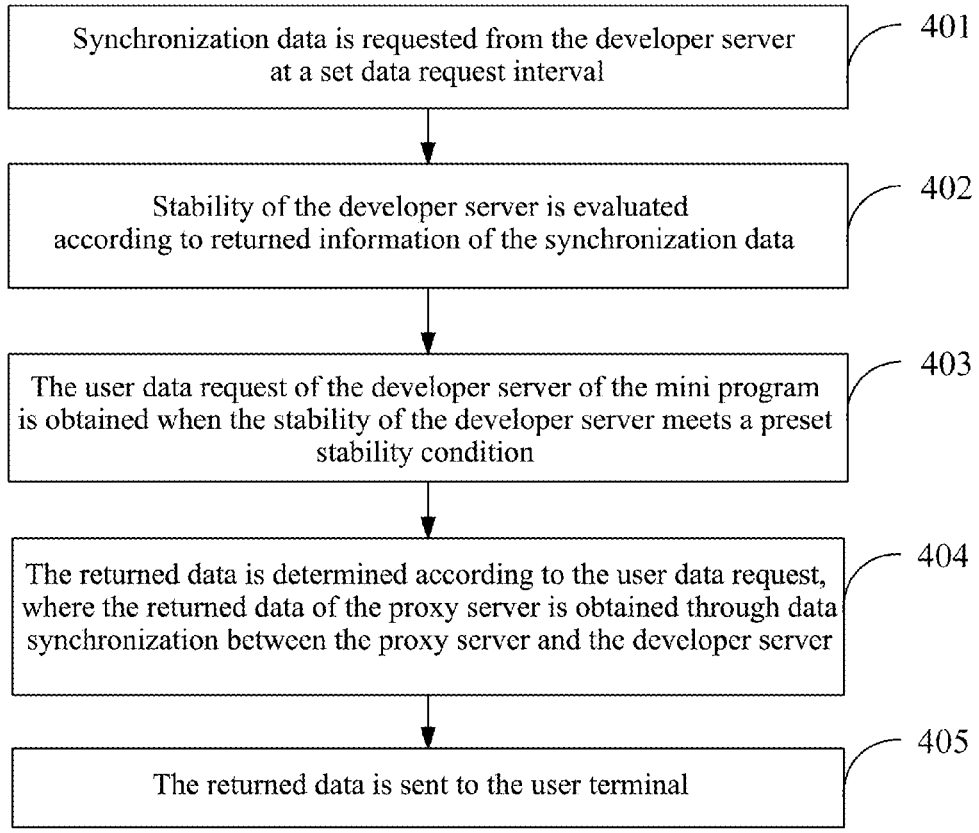
FIG. 4 is a schematic diagram of a third embodiment according to the present application.

FIG. 4 is a schematic diagram of a third embodiment according to the present application. On the basis of the first embodiment, steps of the proxy server performing data synchronization with the developer server and determining the stability of the developer server are added before Step 201 in the present embodiment. As shown in FIG. 4, the method for processing mini program data provided by the present embodiment includes:

Step 401, synchronization data is requested from the developer server at a set data request interval.

The set data request interval may be a fixed data interval or a transformed data interval. For example, the set data request interval may be determined for each period of time according to design requirements.

Illustratively, the proxy server or proxy server cluster may request synchronization data from the developer server every 5 minutes, 10 minutes, 1 hour, or at other time intervals. The proxy server or proxy server cluster may also request synchronization data at a first time interval from 0:00 to 6:00, request synchronization data at a second time interval from 6:00 am to 12:00, request synchronization data at a third time interval from 12:00 to 18:00, and request synchronization data at a fourth time interval from 18:00 to 24:00, where each time interval may be different.

Step 402, stability of the developer server is evaluated according to returned information of the synchronization data.

The returned information may be a status code of the synchronization data, or feedback information of the synchronization data, such as whether the synchronization data is sent successfully or whether the synchronization data is sent overtime.

Specifically, the status of the developer server may be judged according to the stability of the developer server, and when its status is not good, that is, when the developer server is unstable, a warning is issued to notify a relevant developer of maintaining or restoring the developer server.

Specifically, when the status code is 200, it means that the evaluation result of the stability of the developer server is stable, or the stability of the developer server meets a preset stability condition. When the status code is 404 or 500, it means that the stability evaluation result of the developer server is unstable, that is, the stability of the developer server does not meet the preset stability condition. Or, when the synchronization data is not sent successfully, the sending times out, or garbled information appears, it means that the evaluation result of the stability of the developer server is unstable, that is, the stability of the developer server does not meet the preset stability condition.

Through the data synchronization between the proxy server or the proxy server cluster and the developer server, the stability of the developer server is judged according to the returned information, and thus the supervision on the developer server is realized, and the stability of the back-end server of the mini program is improved.

Step 403, the user data request of the developer server of the mini program is obtained when the stability of the developer server meets a preset stability condition.

The user data request is generated by the developer server according to a user request of a user terminal of the mini program.

Step 404, returned data is determined according to the user data request, where the returned data of the proxy server is obtained through data synchronization between the proxy server and the developer server.

Step 405, the returned data is sent to the user terminal.

In the present embodiment, through the data synchronization between the proxy server and the developer server, the stability of the developer server is judged according to the returned information, and thus the supervision on the developer server is realized, and the stability of the back-end server of the mini program is improved. The proxy server determines the returned data according to the user data request, and sends the returned data to the user terminal, which improves the efficiency and speed of data transmission of the mini program, and improves the user experience.

This application provides a method for processing mini program data, which is applied to the field of data processing technologies in the field of computer technologies. By adding a proxy server designed by a third party to the back-end server of the mini program, the proxy server maintains data synchronization with the developer server of the mini program, so that the proxy server can host the data of the developer server and monitor the state of the developer server, thereby improving the stability of the mini program server and the data transmission speed of the mini program, and improving the user experience of the mini program.

Figure 5:
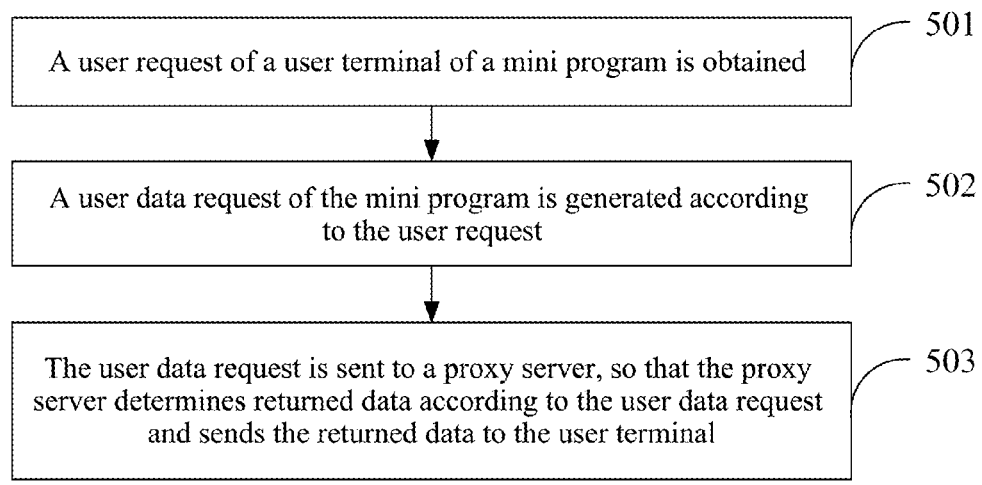
FIG. 5 is a schematic diagram of a fourth embodiment according to the present application.

FIG. 5 is a schematic diagram of a fourth embodiment according to the present application. As shown in FIG. 5, the method for processing mini program data provided in the present embodiment is applied to a developer server, and the method includes:

Step 501, a user request of a user terminal of a mini program is obtained.

Step 502, a user data request of the mini program is generated according to the user request.

Step 503, the user data request is sent to a proxy server, so that the proxy server determines returned data according to the user data request and sends the returned data to the user terminal.

The returned data of the proxy server is obtained through data synchronization between the proxy server and the developer server.

Further, the type of returned data corresponding to the user request may also be determined according to the user request, and when the type of the returned data is a set type, the user data request is sent to the proxy server.

The set type may be a data rendering type, such as loading of resources such as pictures, audios and videos. Of course, a scope of the set type may also be determined through negotiation between the developer of the mini program and the administrator of the proxy server.

Further, when the type of returned data is a privacy type, such as payment data, account data, etc., the developer server directly determines the returned data from the data stored in the developer server according to the user request, and sends the returned data to the user terminal.

In the present embodiment, the proxy server perform data synchronization with the developer server, the user data request is generated through the developer server according to the user request, the data required by the user is returned through the proxy server according to the user data request, which realizes the hosting of mini program data, and improves the speed for processing the mini program data and the stability of the mini program server, and improves the quality of the mini program and the user experience.

Optionally, the user data request includes a returned data request and a proxy server startup request, and the step of sending the user data request to a proxy server, so that the proxy server determines returned data according to the user data request and sends the returned data to the user terminal, includes:

sending the returned data request to the proxy server when the proxy server startup request is to start the proxy server, so that the proxy server determines the returned data according to the returned data request and sends the returned data to the user terminal.

The proxy server startup request is a parameter used to indicate whether the proxy server needs to be started for the current user request. The returned data request is a request of the returned data corresponding to the user request.

Specifically, the designer or developer of the mini program may configure specific parameters of the proxy server startup request, such as "to start the proxy server" or "not to start the proxy server", for each kind of user request in advance in a development phase or a subsequent use phase.

Further, when the developer designs the developer server, the developer can add an expression of whether to start the proxy server in a data request API (Application Programming Interface), such as swan.request API, and add an attribute of whether to start the proxy server in a data request component, such as a picture component, a video component and an audio component, so as to realize the generation of the proxy server startup request.

Optionally, when the proxy server startup request is not to start the proxy server, the returned data is determined via the developer server according to the returned data request, and the returned data is sent to the user terminal via the developer server.

Here, "not to start the proxy server" means that data service for the user request of the mini program is not provided through the proxy server, then the developer server determines the returned data according to the returned data request or the user request, and sends the returned data to the user terminal.

By introducing the design of the expression on whether to start the proxy server in the developer expression, the diversification of the mini program development design is improved, so that the developer can customize the proxy server attribute of each user request of the mini program according to their own needs.

Optionally, the method for processing mini program data further includes:

obtaining a data update request of the proxy server; and updating the returned data according to the data update request, and sending the updated returned data to the proxy server, to send the updated returned data to the user terminal via the proxy server.

Specifically, when the returned data of the proxy server is invalid, such as the valid time expires, or the proxy server does not store the returned data, the proxy server will send a data update request to the developer server, the developer server may obtain updated returned data from the developer server according to the data update request and send the updated returned data to the proxy server, and then the proxy server sends the updated returned data to the user terminal. Of course, after the developer server updates the returned data according to the data update request, the developer server may directly send the updated returned data to the user terminal, and at the same time, send the updated returned data to the proxy server to update the data stored by the proxy server.

Optionally, the method for processing mini program data further includes:

obtaining a stability evaluation result of the developer server from the proxy server, where the stability evaluation result is determined by the proxy server according to returned information of synchronization data, and the synchronization data is obtained by the proxy server cluster through initiating a data synchronization request to the developer server at a set data request interval; and performing a stability warning of the developer server according to the stability evaluation result.

Specifically, when the stability evaluation result is unstable, the developer server will issue a server stability warning to remind developers of maintaining the developer server to ensure the stability and normal operation of the server.

Figure 6:
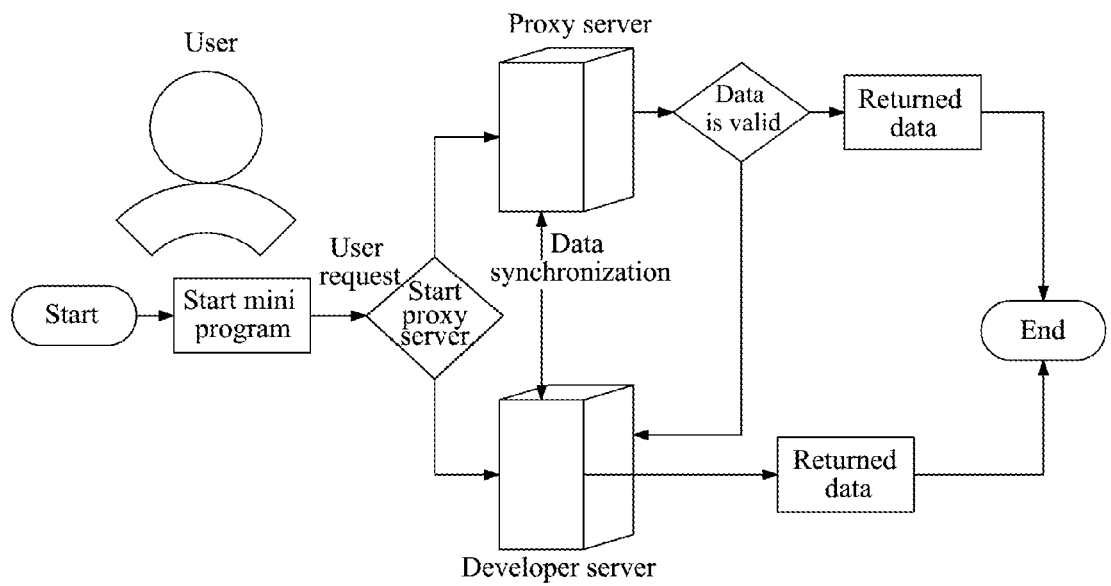
FIG. 6 is a schematic diagram of a fifth embodiment according to the present application.

FIG. 6 is a schematic diagram of a fifth embodiment according to the present application. As shown in FIG. 6, a main process of the method for processing mini program data provided by the present embodiment includes:

First, a user starts a mini program on a user terminal, and generates a user request through an operation of the user. A developer server determines whether the user request needs to start a proxy server, if yes, the developer server generates a user data request according to the user request, and the proxy server determines the returned data according to the user data request and judges whether the returned data is cached in the proxy server, if yes, the proxy server obtains the returned data and sends the returned data to the user terminal; if not, the proxy server sends a returned data request to the developer server, and the developer server sends the returned data to the user terminal. If the expression in the user request is not to start the proxy server, the developer server determines the returned data according to the user request, and sends the returned data to the user terminal. Here, data synchronization is maintained between the proxy server and the developer server.

In the present embodiment, the proxy server perform data synchronization with the developer server, the user data request is generated by the developer server according to the user request, the data required by the user is returned by the proxy server according to the user data request, which realizes the hosting of mini program data, and improves the speed for processing the mini program data and the stability of the mini program server, and improves the quality of the mini program and the user experience.

Figure 7:
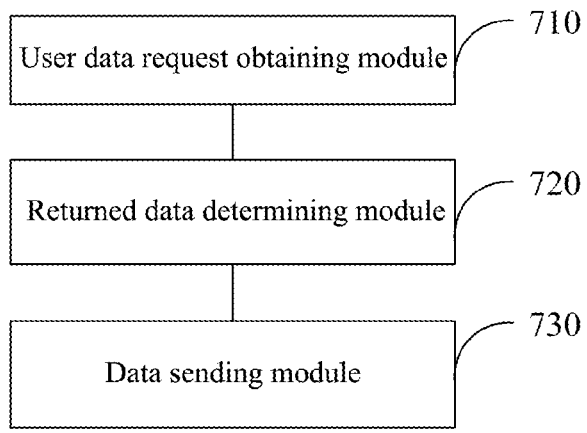
FIG. 7 is a schematic diagram of a sixth embodiment according to the present application.

FIG. 7 is a schematic diagram of a sixth embodiment according to the present application. As shown in FIG. 7, a device for processing mini program data provided by the present embodiment includes: a user data request obtaining module 710, a returned data determining module 720 and a data sending module 730.

The user data request obtaining module 710 is configured to obtain a user data request of a developer server of a mini program, where the user data request is generated by the developer server according to a user request of a user terminal of the mini program; the returned data determining module 720 is configured to determine returned data via a proxy server according to the user data request, where the returned data of the proxy server is obtained through data synchronization between the proxy server and the developer server; and the data sending module 730 is configured to send the returned data to the user terminal.

Optionally, the proxy server is one or more servers in a proxy server cluster, and the returned data determining module 720 includes:

a proxy server determining unit, configured to determine a proxy server of the user terminal from the proxy server cluster according to the user data request; and a returned data determining unit, configured to determine the returned data via the proxy server according to the user data request.

Optionally, the device further includes:

a data synchronization module, configured to request synchronization data from the developer server via the proxy server cluster at a set data request interval, and evaluate stability of the developer server according to returned information of the synchronization data.

Optionally, the device further includes:

a data validity judging module, configured to judge, via the proxy server, whether the returned data is valid data, after the returned data is determined via the proxy server according to the user data request; correspondingly, the returned data determining module 720 is specifically configured to: send the returned data to the user terminal when the returned data is valid data.

Optionally, the device further includes:

a data update request module, configured to, when the user data is invalid data, send a data update request to the developer server via the proxy server, to update the returned data according to the data update request; correspondingly, the returned data determining module 720 is specifically configured to: send the updated returned data to the user terminal.

In the present embodiment, the proxy server performs data synchronization with the developer server, the user data request is generated through the developer server according to the user request, the data required by the user is returned through the proxy server according to the user data request, which realizes the hosting of mini program data, and improves the speed for processing the mini program data and the stability of the mini program server, and improves the quality of the mini program and the user experience.

Figure 8:
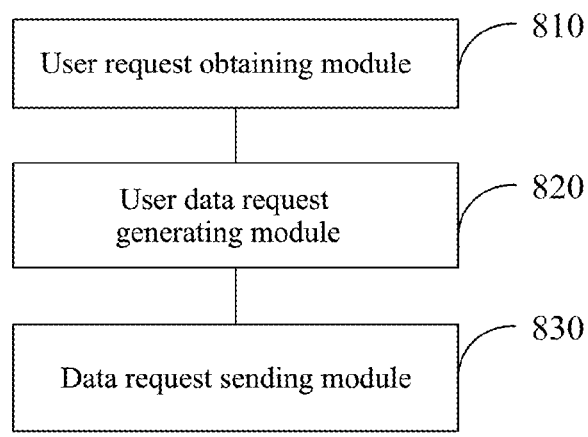
FIG. 8 is a schematic diagram of a seventh embodiment according to the present application.

FIG. 8 is a schematic diagram of a seventh embodiment according to the present application. As shown in FIG. 8, the device for processing mini program data provided by the present embodiment includes: a user request obtaining module 810, a user data request generating module 820 and a data request sending module 830.

The user request obtaining module 810 is configured to obtain a user request of a user terminal of a mini program; the user data request generating module 820 is configured to generate a user data request of the mini program according to the user request; the data request sending module 830 is configured to send the user data request to a proxy server, so that the proxy server determines returned data according to the user data request and sends the returned data to the user terminal, where the returned data of the proxy server is obtained through data synchronization between the proxy server and the developer server.

Optionally, the user data request includes a returned data request and a proxy server startup request, and the data request sending module 830 is specifically configured to:

when the proxy server startup request is to start the proxy server, send the returned data request to the proxy server, so that the proxy server determines the returned data according to the returned data request and sends the returned data to the user terminal.

Optionally, the device further includes:

a second returned data determining module, configured to, when the proxy server startup request is not to start the proxy server, determine the returned data via the developer server according to the returned data request, and send the returned data to the user terminal via the developer server.

Optionally, the device further includes:

a data update request obtaining module, configured to obtain a data update request of the proxy server; and a returned data updating module, configured to update the returned data according to the data update request, and send the updated returned data to the proxy server, to send the updated returned data to the user terminal via the proxy server.

Optionally, the device further includes:

a stability obtaining module, configured to obtain a stability evaluation result of the developer server from the proxy server, where the stability evaluation result is determined by the proxy server according to returned information of synchronization data, and the synchronization data is obtained by the proxy server cluster through initiating a data synchronization request to the developer server at a set data request interval; and a stability warning module, configured to perform a stability warning of the developer server according to the stability evaluation result.

In the present embodiment, the proxy server performs data synchronization with the developer server, the user data request is generated through the developer server according to the user request, the data required by the user is returned through the proxy server according to the user data request, which realizes the hosting of mini program data, and improves the speed for processing the mini program data and the stability of the mini program server, and improves the quality of the mini program and the user experience.

According to the embodiments of the present application, the present application also provides a proxy server, a developer server and a readable storage medium.

Figure 9:
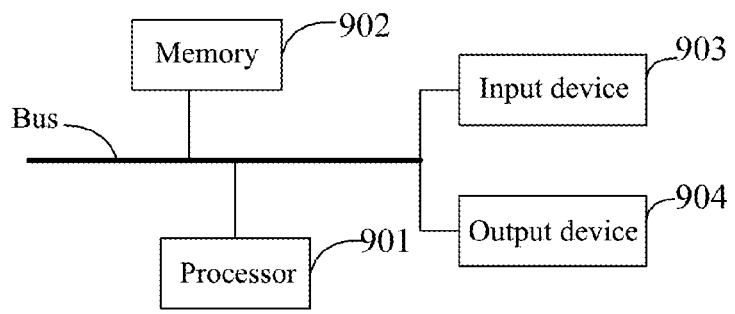
FIG. 9 is a block diagram of a proxy server used to implement a method for processing mini program data in any embodiment of the first embodiment to the fourth embodiment of the present application.

FIG. 9 is a block diagram of a proxy server used to implement a method for processing mini program data in any embodiment of the first embodiment to the fourth embodiment of the present application. The components, their connections and relationships, and their functions shown herein are merely examples, and are not intended to limit the implementation of the present application described and/or required herein.

As shown in FIG. 9, the proxy server includes: one or more processors 901, a memory 902, and an interface for connecting various components, where the interface includes a high-speed interface and a low-speed interface. The various components are connected to each other by using different buses, and can be installed on a common motherboard or installed in other ways as needed. The processor may process instructions executed in the electronic device, including instructions stored in or on the memory to display graphical information of a GUI on an external input/output device (such as a display device coupled to an interface). In other embodiments, multiple processors and/or multiple buses may be used with multiple memories if necessary. Similarly, multiple electronic devices can be connected, and each device provides some necessary operations (for example, as a server array, a group of blade servers, or a multi-processor system). One processor 901 is taken as an example in FIG. 9.

The memory 902 is a non-transitory computer-readable storage medium provided by the present application, where the memory stores instructions executable by at least one processor, so that the at least one processor executes the method for processing mini program data provided in any of the first to fourth embodiments of the present application. The non-transitory computer-readable storage medium of the present application stores computer instructions, and the computer instructions are used to cause a computer to execute the method for processing mini program data provided by the present application.

As a non-transitory computer-readable storage medium, the memory 902 can be used to store non-transitory software programs, non-transitory computer-executable programs and modules, such as program instructions/modules corresponding to the method for processing mini program data in the embodiments of the present application (for example, the user data request obtaining module 710, the returned data determining module 720 and the data sending module 730 shown in FIG. 7). The processor 901 executes various functional applications and data processing of the server by running the non-transitory software programs, instructions, and modules stored in the memory 902, that is, implements the method for processing the mini program data in any method embodiment of the first embodiment to the fourth embodiment of the present application.

The memory 902 may include a program storage area and a data storage area, where the program storage area may store an operating system and an application program required by at least one function; and the data storage area can store data generated according to the use of an electronic device for processing mini program data, etc. In addition, the memory 902 may include a high-speed random access memory, and may also include a non-transitory memory, such as at least one magnetic disk storage device, a flash memory device, or other non-transitory solid-state storage devices. In some embodiments, the memory 902 may optionally include memories remotely provided with respect to the processor 901, and these remote memories may be connected to an electronic device for processing mini program data via a network. Examples of the aforementioned network include, but are not limited to, the Internet, a corporate intranet, a local area network, a mobile communication network, and combinations thereof.

The proxy server of the method for processing mini program data may also include an input device 903 and an output device 904. The processor 901, the memory 902, the input device 903, and the output device 904 may be connected by a bus or in other ways. The connection by a bus is taken as an example in FIG. 9.

The input device 903 can receive input digital or character information, and generate key signal input related to user settings and function control of the electronic equipment for processing mini program data, which is, for example, an input device such as a touch screen, a keypad, a mouse, a track pad, a touchpad, a pointing stick, one or more mouse buttons, a trackball, and a joystick. The output device 904 may include a display device, an auxiliary lighting device (for example, LED), a tactile feedback device (for example, a vibration motor), etc. The display device may include, but is not limited to, a liquid crystal display (LCD), a light emitting diode (LED) display, and a plasma display. In some embodiments, the display device may be a touch screen.

Figure 10:
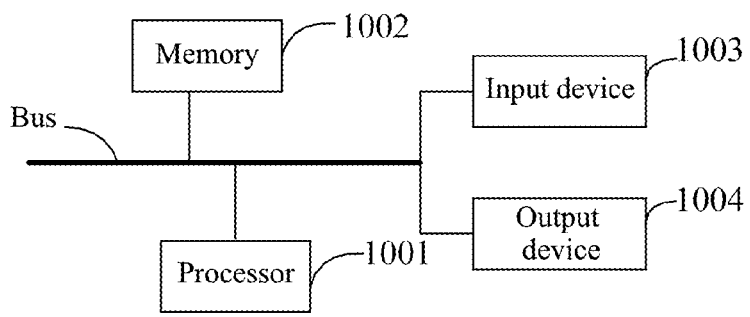
FIG. 10 is a block diagram of a proxy server used to implement a method for processing mini program data in the fifth embodiment of the present application.

FIG. 10 is a block diagram of a proxy server used to implement a method for processing mini program data in the fifth embodiment of the present application. The components, their connections and relationships, and their functions shown herein are merely examples, and are not intended to limit the implementation of the present application described and/or required herein.

As shown in FIG. 10, the developer server includes: one or more processors 1001, a memory 1002, and an interface for connecting various components, where the interface includes a high-speed interface and a low-speed interface. The various components are connected to each other by using different buses, and can be installed on a common motherboard or installed in other ways as needed. The processor may process instructions executed in the electronic device, including instructions stored in or on the memory to display graphical information of a GUI on an external input/output device (such as a display device coupled to an interface). In other embodiments, multiple processors and/or multiple buses may be used with multiple memories if necessary. Similarly, multiple electronic devices can be connected, and each device provides some necessary operations (for example, as a server array, a group of blade servers, or a multi-processor system). One processor 1001 is taken as an example in FIG. 10.

The memory 1002 is a non-transitory computer-readable storage medium provided by the present application, where the memory stores instructions executable by at least one processor, so that the at least one processor executes the method for processing mini program data provided in fifth embodiment of the present application. The non-transitory computer-readable storage medium of the present application stores computer instructions, and the computer instructions are used to cause a computer to execute the method for processing mini program data provided by the present application.

As a non-transitory computer-readable storage medium, the memory 1002 can be used to store non-transitory software programs, non-transitory computer-executable programs and modules, such as program instructions/modules corresponding to the method for processing mini program data in the embodiments of the present application (for example, the user request obtaining module 810, the user data request generating module 820 and the data request sending module 830 shown in FIG. 8). The processor 1001 executes various functional applications and data processing of the server by running the non-transitory software programs, instructions, and modules stored in the memory

1002, that is, implements the method for processing the mini program data in any method embodiment of the fifth embodiment of the present application.

The memory 1002 may include a program storage area and a data storage area, where the program storage area may store an operating system and an application program required by at least one function; and the data storage area can store data generated according to the use of an electronic device for processing mini program data, etc. In addition, the memory 1002 may include a high-speed random access memory, and may also include a non-transitory memory, such as at least one magnetic disk storage device, a flash memory device, or other non-transitory solid-state storage devices. In some embodiments, the memory 1002 may optionally include memories remotely provided with respect to the processor 1001, and these remote memories may be connected to an electronic device for processing mini program data via a network. Examples of the aforementioned networks include, but are not limited to, the Internet, a corporate intranet, a local area network, a mobile communication network, and combinations thereof.

The developer server of the method for processing mini program data may also include an input device 1003 and an output device 1004. The processor 1001, the memory 1002, the input device 1003, and the output device 1004 may be connected by a bus or in other ways. The connection by a bus is taken as an example in FIG. 10.

The input device 1003 can receive input digital or character information, and generate key signal input related to the user settings and function control of the electronic equipment for processing mini program data, which is, for example, an input device such as a touch screen, a keypad, a mouse, a trackpad, a touchpad, a pointing stick, one or more mouse buttons, a trackball, and a joystick. The output device 1004 may include a display device, an auxiliary lighting device (for example, LED), a tactile feedback device (for example, a vibration motor), etc. The display device may include, but is not limited to, a liquid crystal display (LCD), a light emitting diode (LED) display, and a plasma display. In some embodiments, the display device may be a touch screen.

Various implementation methods of the systems and techniques described herein can be implemented in digital electronic circuit systems, integrated circuit systems, application specific ASICs (application specific integrated circuits), computer hardware, firmware, software, and/or combinations thereof. These various implementation methods may include: implementing in one or more computer programs which can be executed and/or interpreted on a programmable system including at least one programmable processor. The programmable processor may be a dedicated or general programmable processor, and may receive data and instructions from a storage system, at least one input device, and at least one output device, and transmit data and instructions to the storage system, the at least one input device, and the at least one output device.

These computer programs (also referred to as programs, software, software applications, or code) include machine instructions of a programmable processor, and can be implemented using high-level process and/or object-oriented programming languages, and/or assembly/machine language. As used herein, the terms "machine-readable medium" and "computer-readable medium" refer to any computer program product, apparatus, and/or device used to provide machine instructions and/or data to a programmable processor (for example, magnetic disks, optical disks, memories, programmable logic devices (PLD)), including a machine-readable medium that receives machine instructions as machine-readable signals. The term "machine-readable signal" refers to any signal used to provide machine instructions and/or data to a programmable processor.

In order to provide interaction with a user, the system and technology described here can be implemented on a computer that includes: a display device for displaying information to the user (for example, a CRT (Cathode Ray Tube) or an LCD (Liquid Crystal Display) monitor); and a keyboard and a pointing device (for example, a mouse or a trackball), where the user can provide input to the computer through the keyboard and the pointing device. Other types of devices can also be used to provide interaction with the user; for example, feedback provided to the user may be any form of sensory feedback (for example, visual feedback, auditory feedback, or tactile feedback); and input may be received from the user in any form (including sound input, voice input or tactile input).

The systems and technologies described herein may be implemented in a computing system including back-end components (for example, as a data server), or a computing system that includes middleware components (for example, an application server), or a computing system including front-end components (for example, a user computer with a graphical user interface or a web browser through which the user can interact with the implementation of the system and technology described herein), or a computing system including any combination of such back-end components, middleware components, or front-end components. The components of the system can be connected to each other through any form or medium of digital data communication (for example, a communication network). Examples of communication networks include: the local area network (LAN), the wide area network (WAN), and the Internet.

The computer system can include a client and a server. The client and server are generally far away from each other and usually interact through a communication network. The relationship between the client and the server is generated by computer programs that run on the corresponding computers and have a client-server relationship with each other.

According to the technical solutions of the embodiments of the present application, the proxy server performs data synchronization with the developer server, the user data request is generated through the developer server according to the user request, the data required by the user is returned through the proxy server according to the user data request, which realizes the hosting of mini program data, and improves the speed for processing the mini program data and the stability of the mini program server, and improves the quality of the mini program and the user experience.

It should be understood that the various forms of processes shown above can be used to reorder, add or delete steps. For example, the steps described in the present application may be executed in parallel, sequentially, or in a different order, as long as the desired result of the technical solution disclosed in the present application can be achieved, which is not limited herein.

The foregoing specific implementations do not constitute a limitation on the protection scope of the present application. Those skilled in the art should understand that various modifications, combinations, sub-combinations, and substitutions can be made according to design requirements and other factors. Any amendments, equivalent substitutions and improvements made within the spirit and principles of the present application shall be included in the protection scope of the present application.

What is claimed is:

1. A method for processing mini program data, the method being applied to a proxy server, and the method comprising:
   obtaining a user data request of a developer server of a mini program, wherein the user data request is generated by the developer server according to a user request of a user terminal of the mini program;
   determining returned data according to the user data request, wherein the returned data of the proxy server is obtained through data synchronization between the proxy server and the developer server; and
   sending the returned data to the user terminal;
   wherein the method further comprising:
   requesting synchronization data from the developer server at a set data request interval; and
   evaluating stability of the developer server according to returned information of the synchronization data;
   correspondingly, the obtaining a user data request of a developer server of a mini program comprises:
   obtaining the user data request of the developer server of the mini program when the stability of the developer server meets a preset stability condition.

2. The method according to claim 1, wherein the proxy server is one or more servers in a proxy server cluster, and the determining returned data according to the user data request comprises:
   determining the proxy server of the user terminal from the proxy server cluster according to the user data request; and
   determining the returned data via the proxy server according to the user data request.

3. The method according to claim 1, wherein after the determining returned data according to the user data request, the method further comprises:
   judging whether the returned data is valid data;
   correspondingly, the sending the returned data to the user terminal comprises:
   sending the returned data to the user terminal when the returned data is valid data.

4. The method according to claim 3, further comprising:
   when the user data is invalid data, sending a data update request to the developer server, to update the returned data according to the data update request;
   correspondingly, the sending the returned data to the user terminal comprises:
   sending the updated returned data to the user terminal.

5. A method for processing mini program data, which is applied to a developer server, wherein the method comprises:
   obtaining a user request of a user terminal of a mini program,
   generating a user data request of the mini program according to the user request; and
   sending the user data request to a proxy server, so that the proxy server determines returned data according to the user data request and sends the returned data to the user terminal, wherein the returned data of the proxy server is obtained through data synchronization between the proxy server and the developer server;
   wherein the method further comprising:
   obtaining a stability evaluation result of the developer server from the proxy server, wherein the stability evaluation result is determined by the proxy server according to returned information of synchronization data, and the synchronization data is obtained by a proxy server cluster through initiating a data synchronization request to the developer server at a set data request interval; and
   performing a stability warning of the developer server according to the stability evaluation result.

6. The method according to claim 5, wherein the user data request comprises a returned data request and a proxy server startup request, and the sending the user data request to a proxy server, so that the proxy server determines returned data according to the user data request and sends the returned data to the user terminal, comprises:
   when the proxy server startup request is to start the proxy server, sending the returned data request to the proxy server, so that the proxy server determines the returned data according to the returned data request and sends the returned data to the user terminal.

7. The method according to claim 6, further comprising:
   when the proxy server startup request is not to start the proxy server, determining the returned data via the developer server according to the returned data request, and sending the returned data to the user terminal via the developer server.

8. The method according to claim 5, further comprising:
   obtaining a data update request of the proxy server; and
   updating the returned data according to the data update request, and sending the updated returned data to the proxy server, to send the updated returned data to the user terminal via the proxy server.

9. A device for processing mini program data, comprising a processor and a memory storing instructions thereon, the processor when executing the instructions, being configured to:
   obtain a user data request of a developer server of a mini program, wherein the user data request is generated by the developer server according to a user request of a user terminal of the mini program; and
   determine returned data via a proxy server according to the user data request, wherein the returned data of the proxy server is obtained through data synchronization between the proxy server and the developer server; and
   send the returned data to the user terminal;
   wherein the processor is further configured to:
   request synchronization data from the developer server at a set data request interval; and
   evaluate stability of the developer server according to returned information of the synchronization data;
   correspondingly, the obtaining a user data request of a developer server of a mini program comprises:
   obtaining the user data request of the developer server of the mini program when the stability of the developer server meets a preset stability condition.

10. The device for processing mini program data according to claim 9, wherein the proxy server is one or more servers in a proxy server cluster, and the processor is configured to:
    determine the proxy server of the user terminal from the proxy server cluster according to the user data request; and
    determine the returned data via the proxy server according to the user data request.

11. The device for processing mini program data according to claim 9, wherein after the returned data is determined via the proxy server according to the user data request, the processor is further configured to:
    judge whether the returned data is valid data;
    correspondingly, the sending the returned data to the user terminal comprises:

sending the returned data to the user terminal when the returned data is valid data.

12. The device for processing mini program data according to claim 11, the processor is further configured to:
when the user data is invalid data, send a data update request to the developer server, to update the returned data according to the data update request;
correspondingly, the sending the returned data to the user terminal comprises:
sending the updated returned data to the user terminal.

* * * * *